(12) United States Patent
Weir (10) Patent No.: US 8,042,652 B2
(45) Date of Patent: Oct. 25, 2011

(54) TREE STAND

(76) Inventor: Joe A. Weir, Chardon, OH (US)

( * ) Notice: Subject to any disclaimer, the term of this patent is extended or adjusted under 35 U.S.C. 154(b) by 287 days.

(21) Appl. No.: 12/453,046

(22) Filed: Apr. 28, 2009

(65) Prior Publication Data

US 2009/0277721 A1   Nov. 12, 2009

Related U.S. Application Data

(60) Provisional application No. 61/071,627, filed on May 8, 2008.

(51) Int. Cl.
*E06C 7/16* (2006.01)
*E04G 3/00* (2006.01)

(52) U.S. Cl. ......................................... 182/116; 182/187

(58) Field of Classification Search .................. 182/116, 182/187, 188
See application file for complete search history.

(56) References Cited

U.S. PATENT DOCUMENTS

| | | | | | |
|---|---|---|---|---|---|
| 1,823,385 | A | * | 9/1931 | Barker | 182/112 |
| 2,066,984 | A | | 1/1937 | Lamb | |
| RE20,653 | E | * | 2/1938 | Lamb | 182/113 |
| 3,116,808 | A | * | 1/1964 | Riley | 182/129 |
| 3,318,415 | A | * | 5/1967 | Christie, Sr. | 182/116 |
| 3,336,999 | A | | 8/1967 | McSwain | |
| 4,056,902 | A | * | 11/1977 | Ziegler, Jr. | 52/73 |
| 4,134,474 | A | | 1/1979 | Stavenau et al. | |
| 4,410,066 | A | * | 10/1983 | Swett | 182/135 |
| 4,412,398 | A | | 11/1983 | Harmon | |
| 4,951,696 | A | | 8/1990 | Jones, Sr. | |
| 5,853,066 | A | | 12/1998 | Gohn | |
| 6,668,977 | B2 | | 12/2003 | Arsenault | |
| 6,725,972 | B1 | | 4/2004 | Krier et al. | |
| 6,793,040 | B2 | * | 9/2004 | Ehrenfried, Sr. | 182/187 |
| 7,246,630 | B1 | | 7/2007 | Ransom et al. | |
| 2004/0216953 | A1 | * | 11/2004 | Cheeks | 182/116 |
| 2007/0130875 | A1 | * | 6/2007 | Detal | 52/650.3 |
| 2007/0235259 | A1 | * | 10/2007 | Tolliver et al. | 182/136 |
| 2009/0095569 | A1 | * | 4/2009 | Cooper et al. | 182/187 |
| 2010/0175951 | A1 | * | 7/2010 | Winson et al. | 182/116 |
| 2010/0300806 | A1 | * | 12/2010 | Ash | 182/113 |

* cited by examiner

*Primary Examiner* — Alvin Chin Shue
*Assistant Examiner* — Jaime F Cardenas-Garcia
(74) *Attorney, Agent, or Firm* — Richard C. Litman (57) ABSTRACT

The tree stand has a lower rectangular platform with an extended opening from the center to an outer edge of the platform for installation around a tree trunk. An upper platform provides a secure seating area. A plurality of support members are pivotally attached to the lower surface of the lower rectangular platform and have teeth on their lower end adapted for securing into the bark of a tree. The tree stand is further secured to the tree by a plurality of angle irons that are mounted at the center of the upper and lower platforms. Adjustable tension straps attach to the angle iron and tighten the platforms to the tree preventing vertical movement of the tree stand. The support members on the lower platform have a hook on the lower end opposite the teeth, and an adjustable tension strap that engages the hooks further tightens the support members against the tree.

11 Claims, 10 Drawing Sheets

TREE STAND

CROSS-REFERENCE TO RELATED APPLICATION

This application claims the benefit of U.S. Provisional Patent Application Ser. No. 61/071,627, filed May 8, 2008.

BACKGROUND OF THE INVENTION

1. Field of the Invention

The present invention relates to devices for concealing-observers and hunters from game animals, and more particularly to a tree stand with a shooting rail and a seat that is raised on a pole or tree and used from an elevated position.

2. Description of the Related Art

Deer hunting in North America dates back to when man first had and made weapons to hunt them. Besides the food value that deer offered early hunters, many items were needed for survival. Early deer hunters used the deer hides for many necessary items, such as moccasins, skirts, dresses, leggings, robes, blankets, archery quivers, straps, harnesses and many other essential items came from deer hunting.

While venison is still considered a delicacy by many people, most modern deer hunting takes the form of sport and recreational activity. There are various types of hunting, from bow and arrow hunting to a range of firearms, such as high-powered rifles or shotguns and muzzleloaders. Most states have special deer seasons that accommodate various hunting methods, in addition to the traditional deer-hunting season that usually occurs in the fall.

The most common method of hunting deer is from tree stands using bows or guns. A tree stand is a perch that may be attached to a tree, typically the tree trunk, for hunting and observing wildlife.

Branches and foliage in deciduous trees generally grow out, away from the trunk, providing natural cover for the hunter. Turkey hunters often use trees to hunt from as well, and bear hunting can also be done using tree stands.

Theoretically, a tree stand gives a hunter an advantage of not only being hidden so that he or she cannot be seen by the game animal, but the elevation also gives a much greater field of view than would otherwise be available to a hunter confined to the ground. A hunter positioned several feet up in a tree would have the potential of a full panoramic view of the area, thus greatly increasing the odds of a successful hunt.

Most tree stands do not fully exploit this potential, as a perched hunter is generally confined to a specific orientation relative to the tree and thus the hunter's maneuverability and field of view are somewhat inhibited. There is a need, therefore, for a tree stand that allows a hunter to maneuver freely, have a full field of view, and is safe and uncomplicated to install in a tree. Thus, a tree stand solving the aforementioned problems is desired.

SUMMARY OF THE INVENTION

The tree stand has a U-shaped lower platform defining a slot extending from the center to the periphery of the platform for installing the tree stand against a tree trunk. An upper platform is supported on the lower platform and provides a secure seating area. A plurality of support members are pivotally attached to the bottom surface of the lower platform and have teeth on their lower end adapted for securing into the bark of a tree. The tree stand is further secured to the tree by a plurality of angle irons that are mounted at the center of the upper and lower platforms. Adjustable tension straps attach to the angle iron and tighten the platforms to the tree, preventing vertical movement of the tree stand. The support members on the lower platform have a hook on the lower end opposite the teeth, and an adjustable tension strap that engages the hooks further tightens the support members against the tree. The support members may be extendable so that the tree stand can be placed at various heights in a tree.

A pair of crossmembers bridge the slot in both the upper and lower platforms so that the tree stand extends a full 360° around the tree. The crossmembers may be attached to the platform by hinges that allow the crossmembers to be opened and closed like a trap door. The crossmembers bridge the slots in the upper and lower platforms and allow for standing and seating without stepping across an opening in the platform. A plurality of vertical posts extend upwards from the perimeter of the lower platform, and a rail is attached between each two adjacent posts. The rail may be used as a handrail for safety, and also provides a support for a bow or gun. A ladder is attached to the outer edge of the lower platform, providing easy access to the tree stand.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
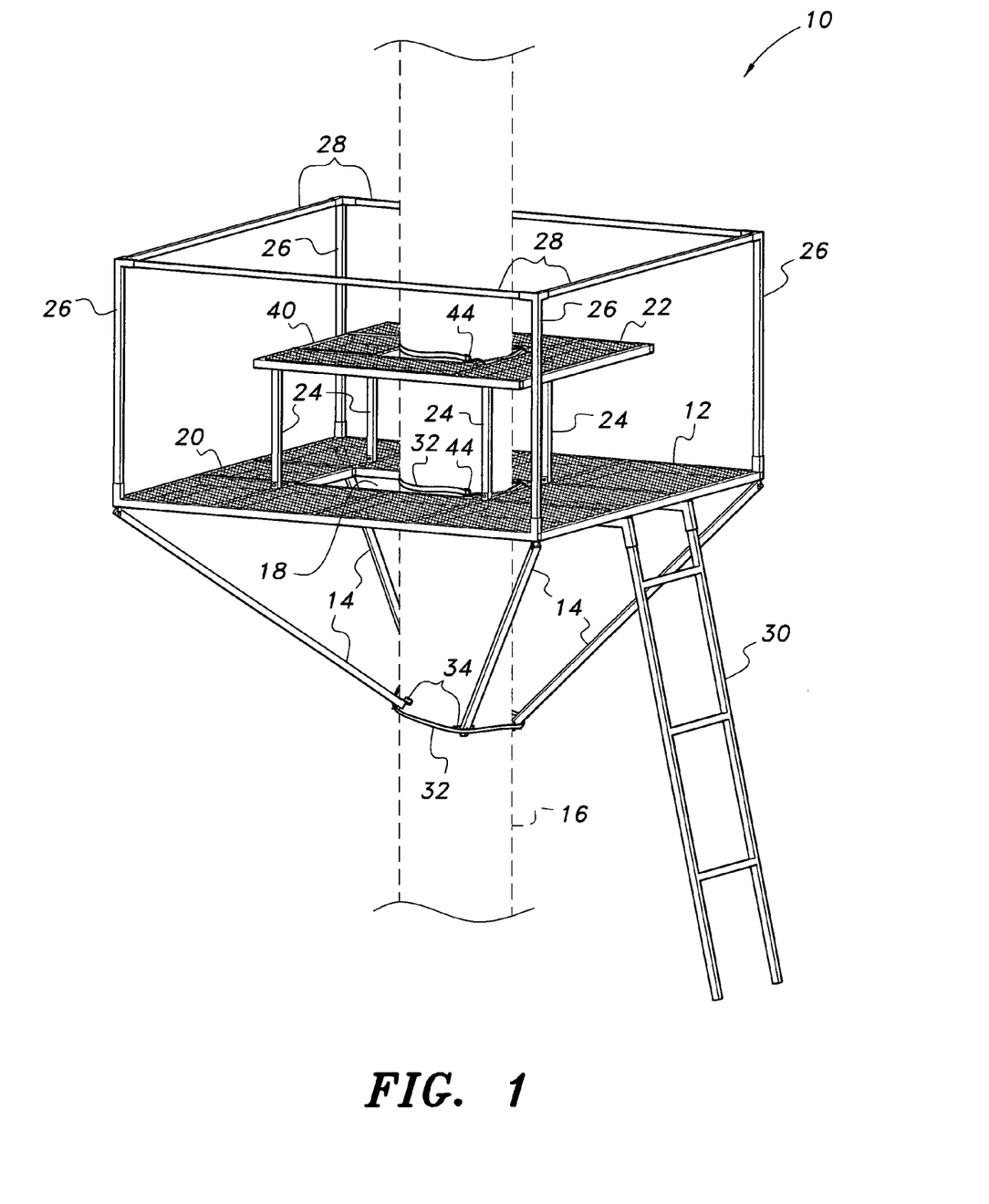
FIG. 1 is an environmental, perspective view of a tree stand according to the present invention.
Figure 5:
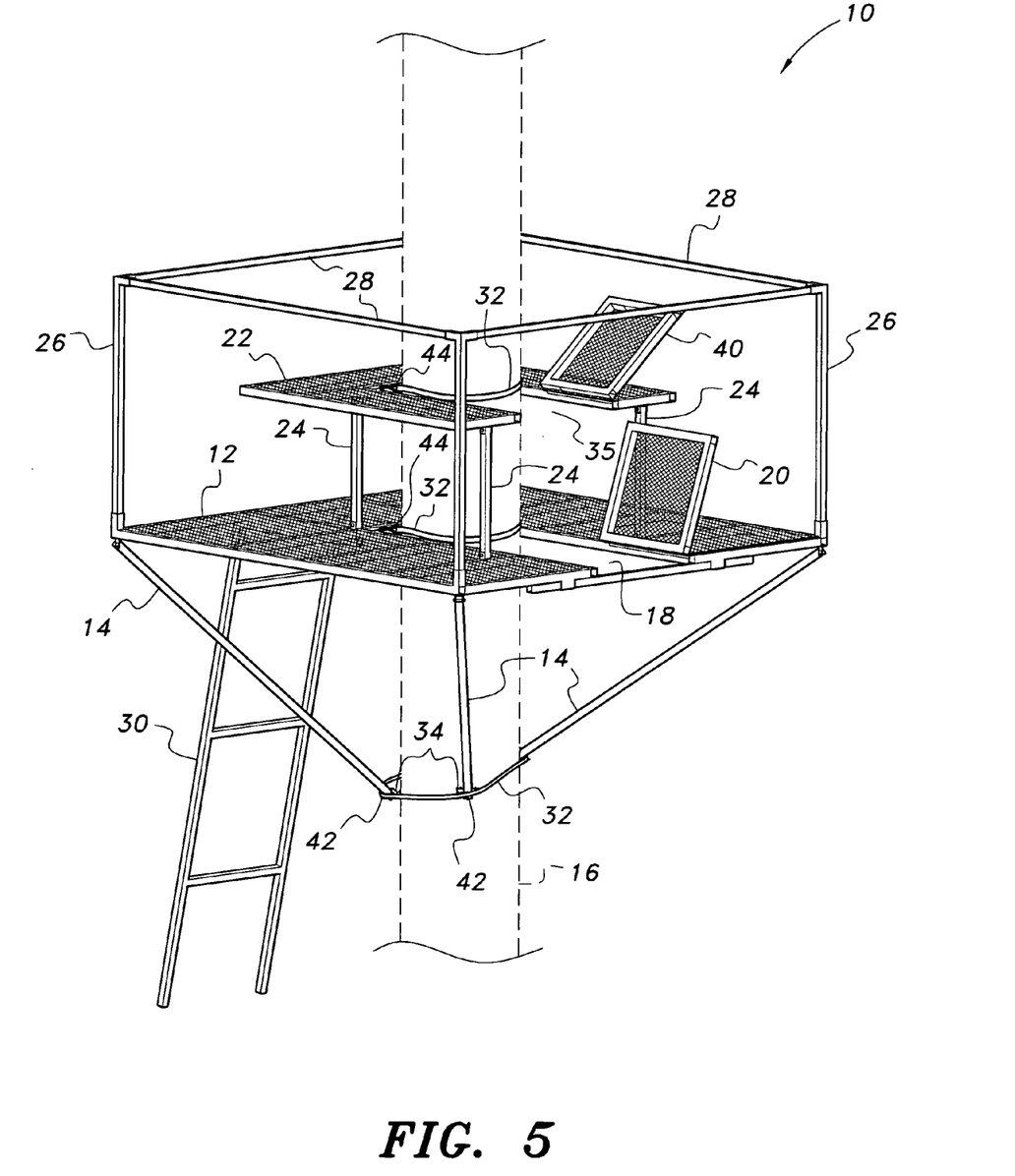
FIG. 5 is an environmental, perspective view of a tree stand according to the present invention, showing the crossmembers raised to open positions.

The present invention relates to a tree stand used by hunters and nature photographers, shown in an environmental perspective view in FIG. 1 and designated generally as 10. A U-shaped, planar lower platform 12 mounts against a tree trunk 16, the platform 12 defining a slot 18 that extends from the center to the periphery of the lower platform 12 so that the lower platform 12 closely abuts or approximates the tree trunk 16 on three sides, as shown in FIG. 5. Although the platform 12 may be constructed in different patterns from various materials, in a preferred embodiment the platform 12 has a frame formed from tubular stock (steel or aluminum) welded together to form beams and joists, and the flooring is formed from a wire mesh attached to the frame, so that the platform 12 is sturdy but relatively lightweight and portable. A plurality of support members 14 are pivotally attached to the lower surface of the lower platform 12 and spaced apart radially. The support members 14 have teeth 34 on their lower end that grip a tree trunk 16, and may be made extendable to allow placement at different heights in the tree 16.

A ladder 30 attached to platform 12 provides access to the lower platform 12. A U-shaped upper platform 22 that has a smaller area than the lower platform 12 mounts to the trunk 16 defines a slot 35 in the upper platform 22 that permits the upper platform 22 to closely abut or approximate the tree trunk 16 on three sides. The upper platform 22 has a frame formed from tubular members and flooring formed from a mesh, similar to the lower platform 12. A plurality of downwardly extending legs 24 that attach to the lower platform 12 support the upper platform 22. The upper platform 22 is adapted for use as a seat. A plurality of vertical posts 26 support rails 28 that are spaced around the periphery of the lower platform 22.

Figure 2:
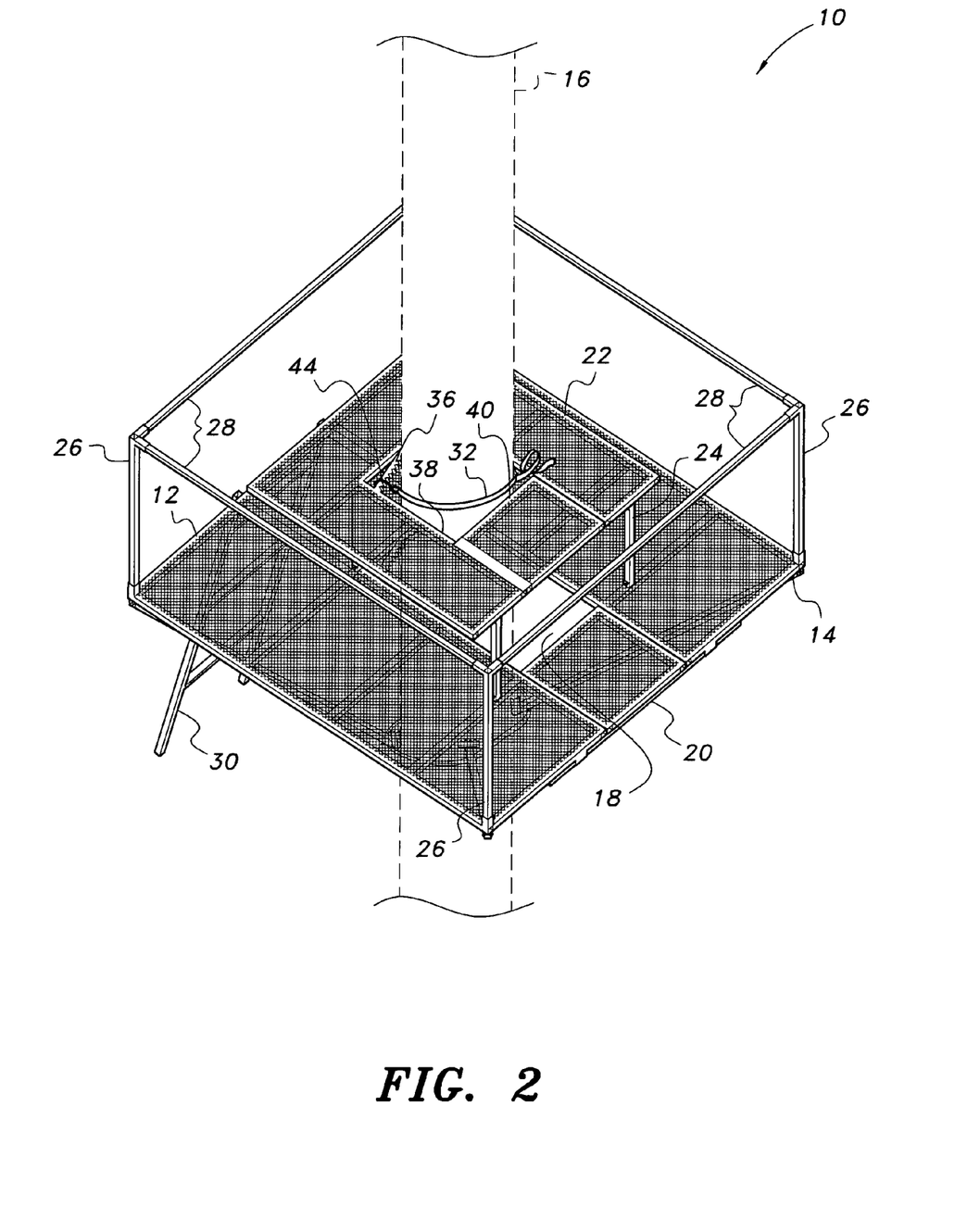
FIG. 2 is an environmental, perspective view of a tree stand according to the present invention as seen from above.

FIG. 2 is an environmental, upper perspective view of the tree stand, showing an angle iron 36 with a saw tooth edge for gripping a tree trunk 16 on the interior of the slot 35 at the center of the upper platform 22. The angle iron 36 is bow-shaped and has opposite ends and its center fixed to the frame members of the upper platform 22 defining the three sides of the slot 35. An adjustable tension strap 32 wraps around the trunk 16 and has opposite ends attached to the angle iron 36, so that when the strap 32 is tightened, the saw tooth edge of the angle iron 36 firmly engages the trunk 16, drawing the upper platform 22 securely against the tree trunk 16 and preventing vertical movement of the tree stand 10. Although the tension strap 32 may have various forms, the strap may be a tie-down strap made from nylon webbing with hooks at the ends and a spring-biased or ratcheting buckle clamp in the middle. A similar angle iron 36 and tension strap 32 are used to secure the lower platform 12 to the tree trunk 16.

Figure 3:
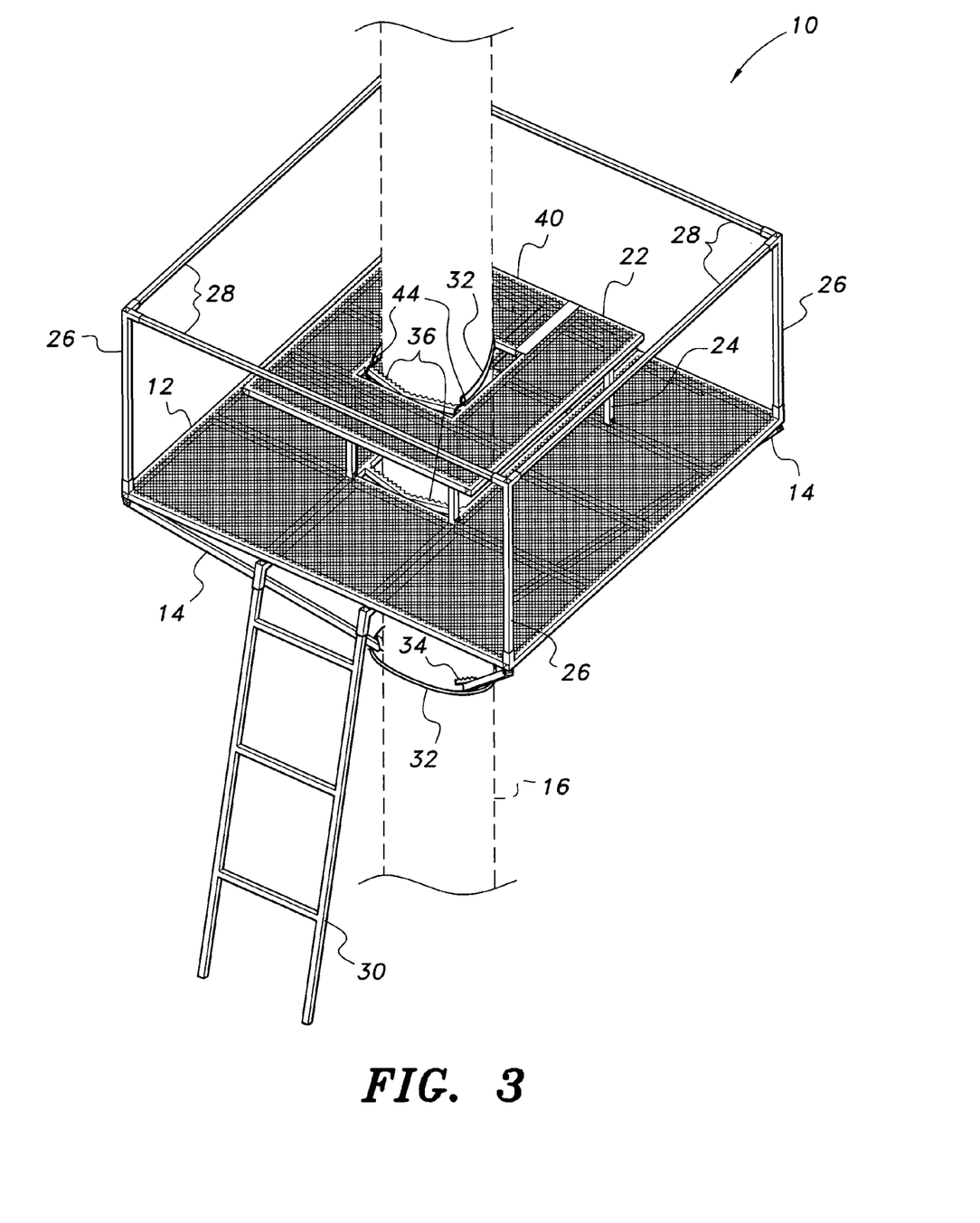
FIG. 3 is an environmental, perspective view of a tree stand according to the present invention similar to FIG. 2, but shown from a different angle.

FIG. 3 shows the positions of the angle irons 36 attached across the slots 35 and 18 of the upper platform 22 and the lower platform 12, respectively. The adjustable tension straps 32 pull the saw tooth edges of the angle irons 36 into contact with the tree 16. The teeth 34 on the lower end of the support members 14 are shown in contact with the tree 16.

Figure 4:
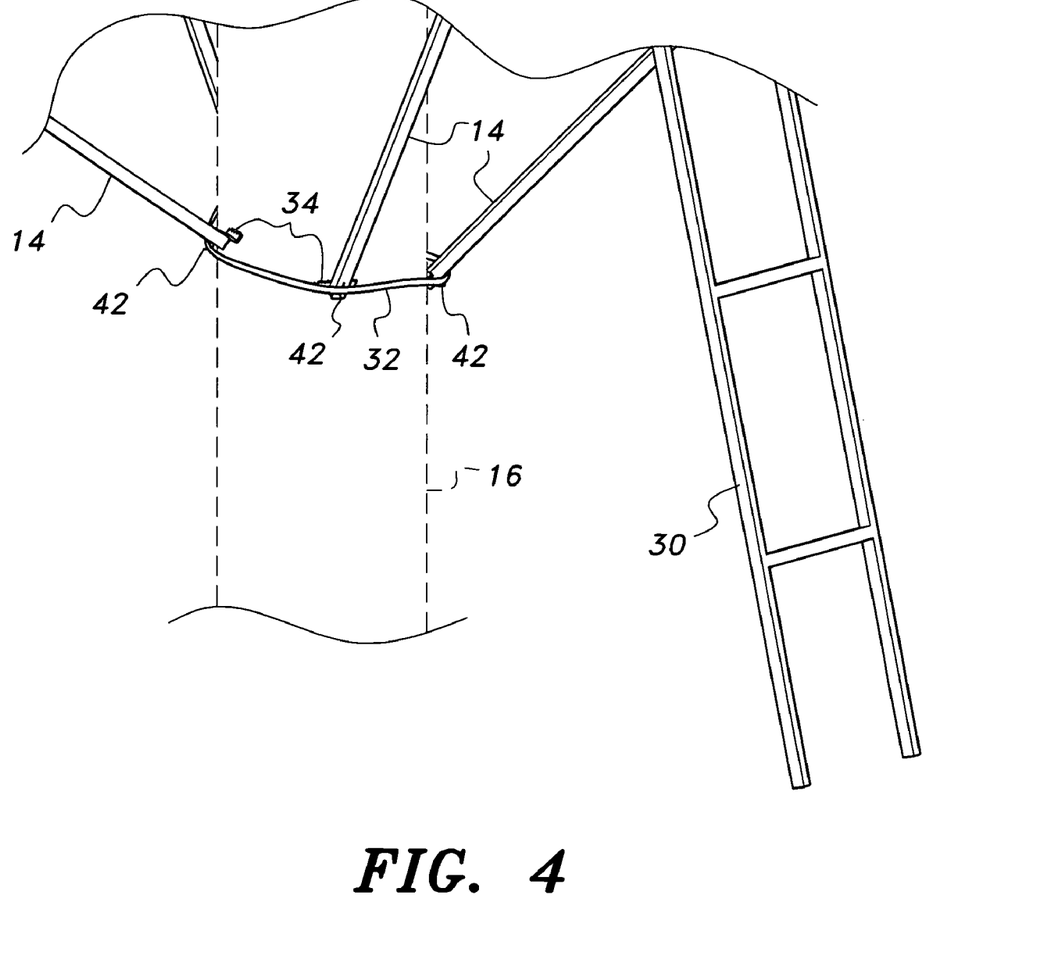
FIG. 4 is an environmental perspective view of the support members of a tree stand according to the present invention, shown braced against a tree trunk.

FIG. 4 is a detailed view of the support members 14 braced against the tree trunk 16. The lower ends of the support members 14 have teeth 34 adapted to grip the tree trunk 16. The adjustable tension strap 32 that is tightened around the tree 16 engages a hook 42 on the side opposite the teeth 34. Tightening the adjustable tension strap 32 pulls the teeth 34 of the support members 14 firmly into contact with the tree trunk 16.

FIG. 5 is an environmental, perspective view of the tree stand 10, installed in a tree 16, shown in phantom view. A crossmember 40 mounts-on the upper platform 22 and bridges the opening 35 on the upper platform 22. A second crossmember and support 20 mounts on the lower platform 12 and bridges the opening 18 on the lower platform 12. The upper 40 and lower 20 crossmembers may be hinged for convenience. When the upper 40 and lower 20 crossmembers are closed across the upper opening 35 and lower opening 18, an observer can sit on any side of the upper platform 22 and walk completely around the lower platform 12 without having to step across the opening 20. The rail 28 may be used as a handrail or provide support for a bow or gun.

Figure 6:
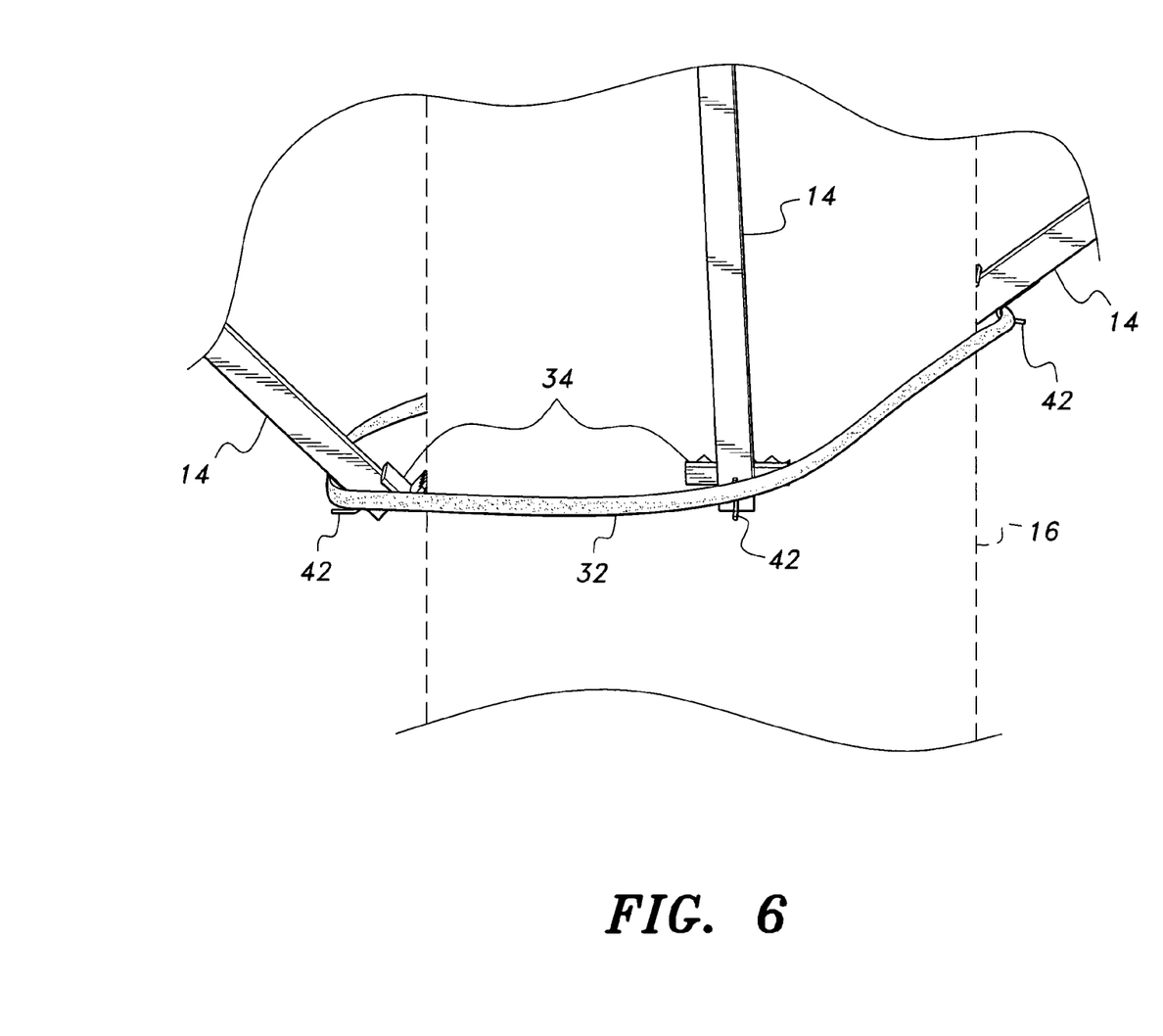
FIG. 6 is a partial detail view of a tree stand according to the present invention, showing the tension strap engaging the lower support members.

FIG. 6 shows the position of the tension strap 32 when it is engaged with the hooks 42 on the lower end of the support members 14. Pulling the tension strap 32 tightly around the tree trunk 16, shown in phantom, tightens the tension strap 32 into the hooks 42 on the lower end of the support members 14, and pushes the teeth 34 into the tree trunk 16, securing the tree stand 10 to the lower part of the tree trunk 16.

Figure 7:
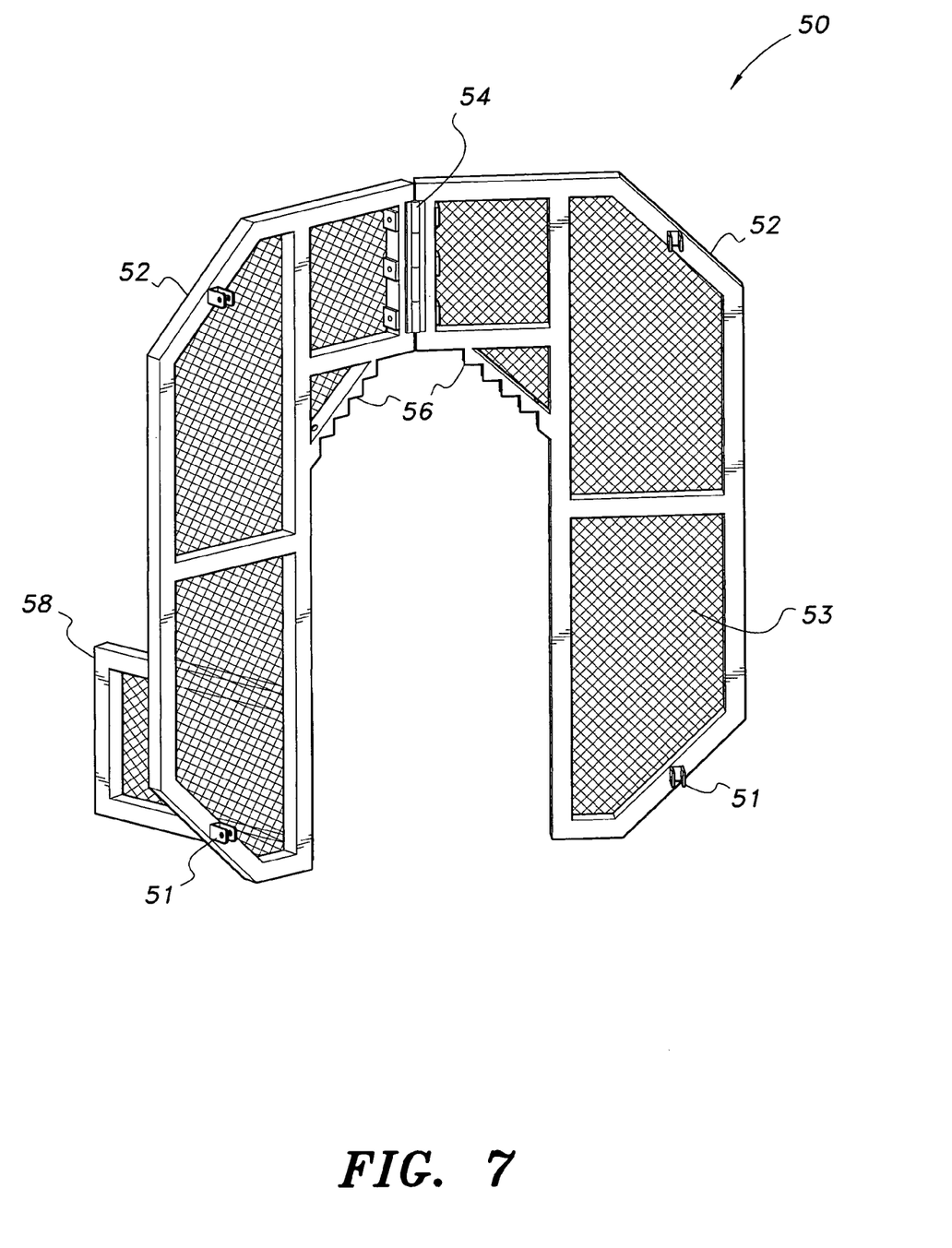
FIG. 7 is a perspective view of an alternative embodiment of an upper platform for a tree stand according to the present invention.

FIG. 7 discloses an alternative upper platform 50 for the tree stand 10. The upper platform 50 is substantially U-shaped, but is divided into two parts connected by a hinge 54. The hinge 54 permits easy disassembly and transport of the platform 50. The platform 50 includes a frame formed from tubular members and flooring formed from mesh 53, similar to the above upper platform 22. The frame includes beveled corners 52 which reduce chances of accidental bumping while the user moves about on the lower platform 12. Integral angle irons 56 with saw teeth are provided on respective halves of the upper platform 50. These angle irons 56 function similarly to angle irons 36 to firmly engage a tree trunk and be held thereby with a strap 32. One of the halves of the upper platform 50 includes a hinged cross member 58 to enclose the platform 50 around the tree trunk, resulting in a complete platform for seating, walking or standing. To securely mount the upper platform 50 relative to the lower platform 12, a plurality of mounting brackets 51 are disposed on the bottom side of the platform 50 for connecting the platform 50 to legs 24.

Figure 8A:
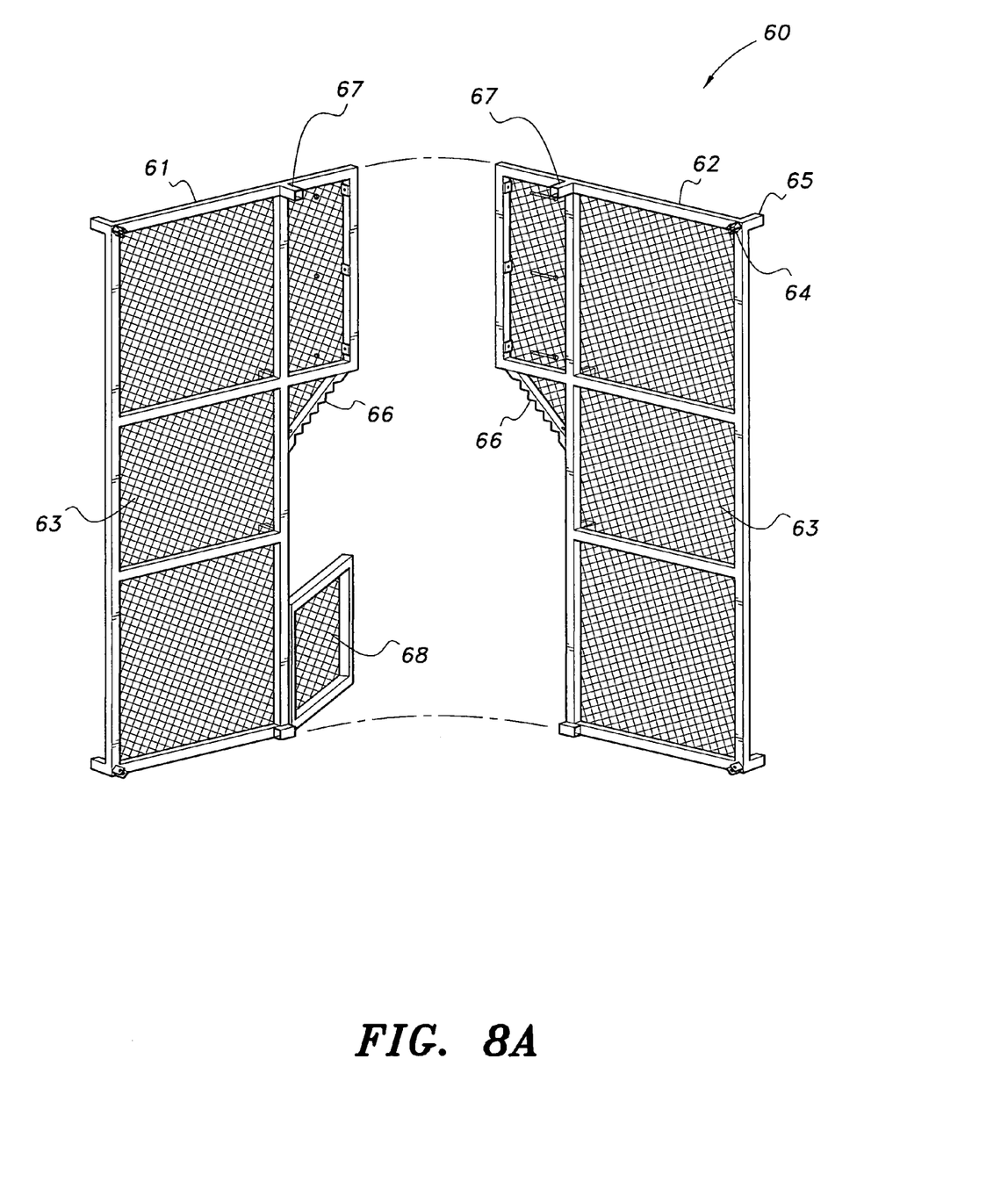
FIG. 8A is an exploded, perspective view of an alternative embodiment of a lower platform for a tree stand according to the present invention.
Figure 8B:
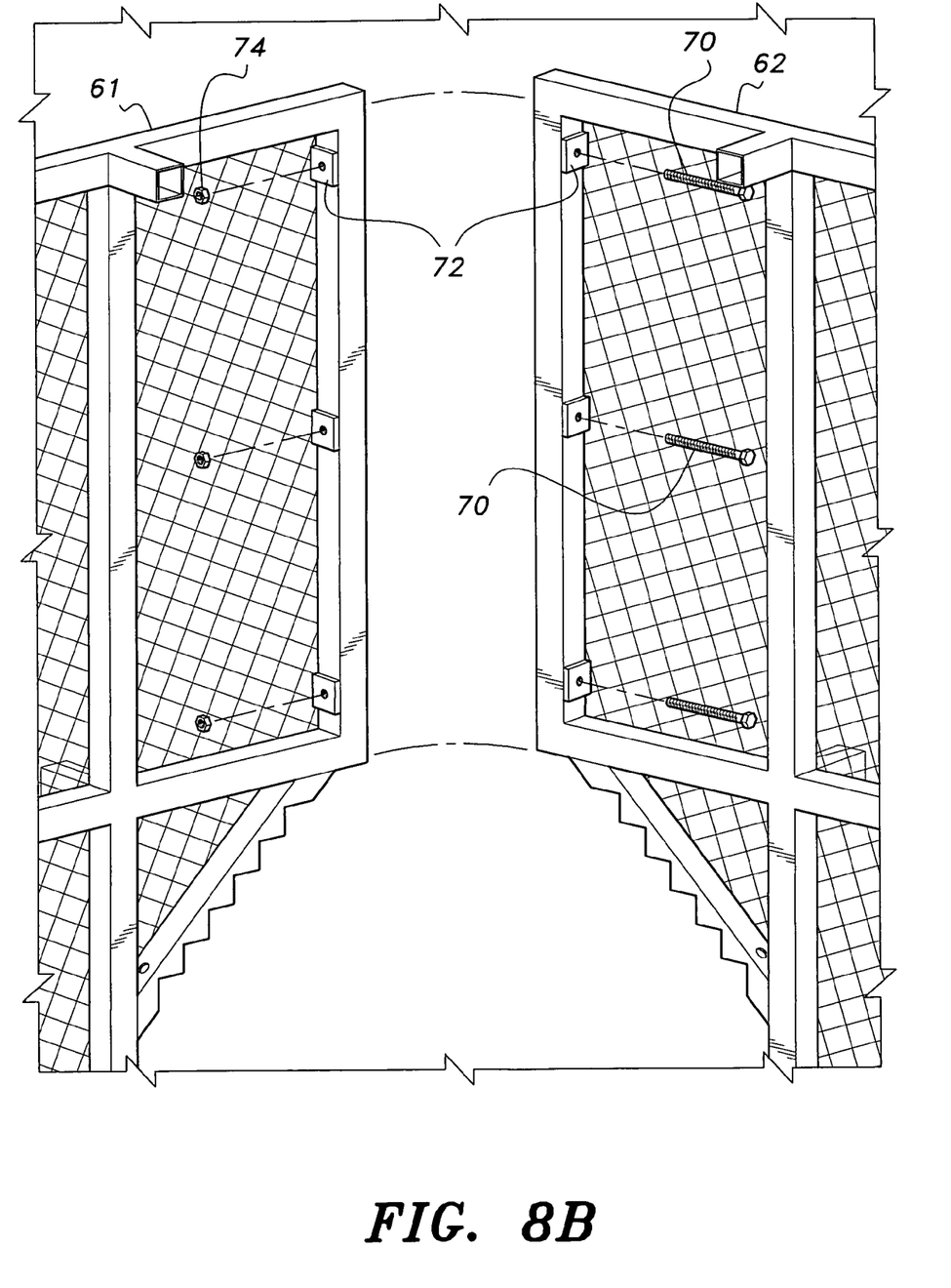
FIG. 8B is an exploded, partial perspective view of the lower platform of FIG. 8A, shown at an expanded scale to show details thereof.

FIGS. 8A-8B disclose an alternative lower platform 60. The U-shaped lower platform 60 is substantially similar to the above lower platform 12, except that the platform 60 is divided into two halves 61, 62. As with the alternative upper platform 50, the division of the lower platform 60 allows for easy disassembly and transport of the same. The two halves 61, are securely mounted together by a bolting system. As shown in FIG. 8B, the bolting system includes a plurality of aligned threaded bores on respective halves 61, 62. Each threaded bore is bolstered by threaded bolt plates 72 adapted to receive respective bolts 70 secured by nuts 74. The platform 60 includes a frame formed from tubular members and flooring formed from mesh 63. Integral angle irons 66 with teeth are provided on respective halves 61, 62 of the lower platform 60. These angle irons 66 function similarly to angle irons 36 to firmly engage a tree trunk and be held thereby with a strap 32. One of the halves 61 of the lower platform 60 includes a hinged crossmember 68 to enclose the platform 60 around the tree trunk, resulting in a complete platform for seating, walking or standing. To securely mount the lower platform 60 to a tree trunk, a plurality of mounting brackets 61 are disposed on the bottom side of the platform 60 for connecting the same to support members 14. The top side of the platform 60 includes a plurality of mounts 65 for the support posts 26.

It is noted that the above lower platform 60 is not limited to a bolting system to connect the two halves 61, 62. A hinge mechanism similar to the upper platform 50 may also be employed. Moreover, the upper platform 50 may employ the bolting system of lower platform 60 in place of the hinge 54.

Figure 9:
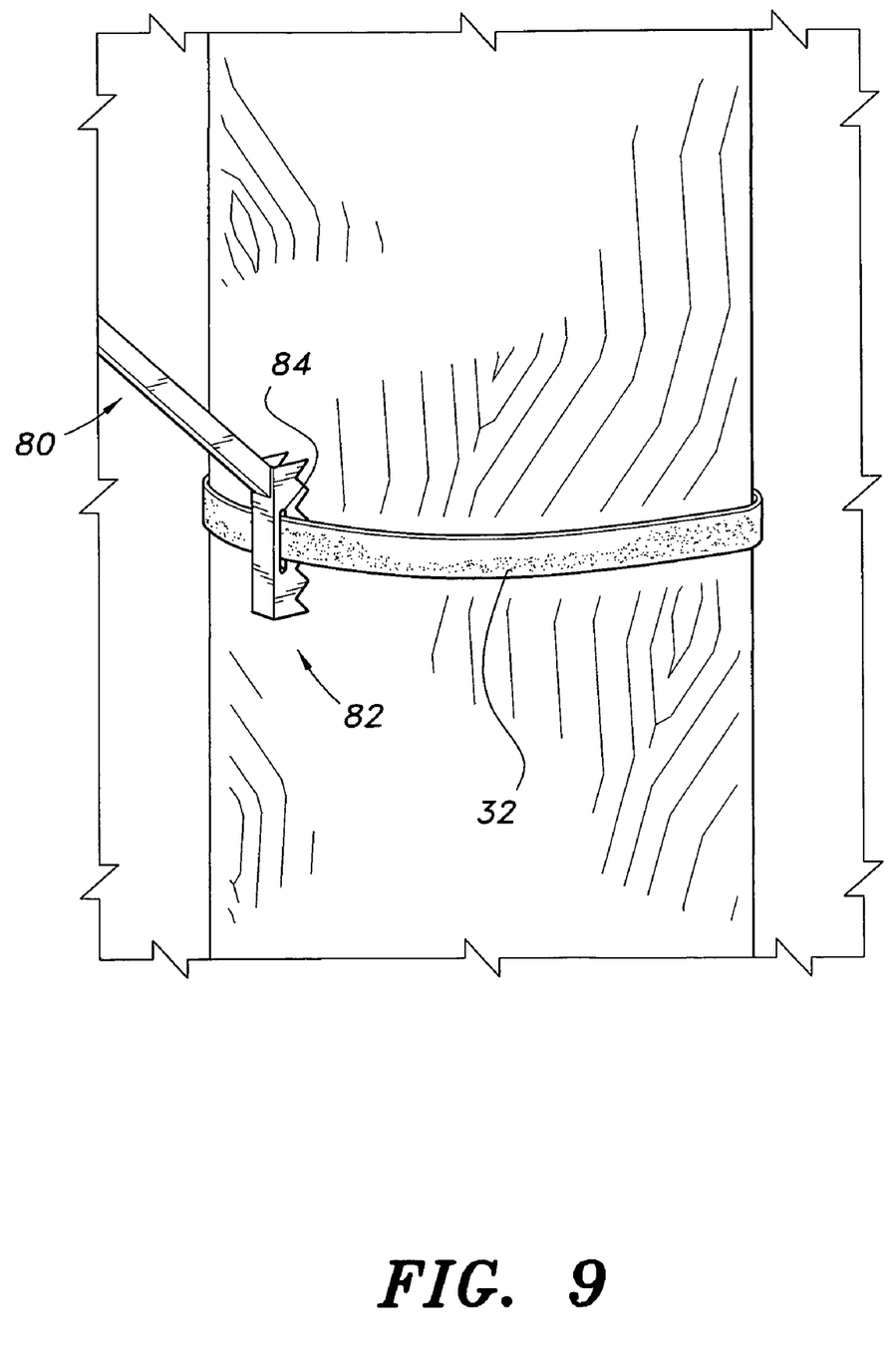
FIG. 9 is an environmental, perspective view of an alternative embodiment of a support member for a tree stand according to the present invention.

FIG. 9 discloses an alternative support member 80 for a platform. The support member 80 includes a vertically oriented gusset 82 with saw teeth for secure engagement with a tree trunk. The gusset 82 includes a vertically oriented slot 84 through which a strap 32 may be threaded. Although FIG. 9 shows only one support member 80, normal use encompasses a plurality of support members surrounding and engaging the tree trunk. The strap 32 threads through all the respective gussets 82 and upon tightening, secures them to the tree trunk. This configuration of the support member 80 provides increased stability for the platforms 12, 50, 60.

It is noted that the tree stand 10 may encompass a variety of alternatives. For example, the tree stand may be made from wood, plastic, steel or a combination thereof. The tree stand may be painted in a variety of colors for camouflage, visual appeal or visual warning. Moreover, each platform 12, 22, 50, 60 may be used singly to provide a place for the user to stand or sit.

It is to be understood that the present invention is not limited to the embodiment described above, but encompasses any and all embodiments within the scope of the following claims.

I claim:

1. A tree stand, comprising:
   a lower platform having an upper surface, a lower surface, a center, an outer edge, and a longitudinal opening extending from the center to the outer edge defining a U-shaped platform;
   a plurality of downwardly extending support members having first and second ends, the first ends of the support members being pivotally connected to the lower surface of the lower platform, the second ends of the support members having gripping teeth adapted for bearing against a tree trunk;
   an upper horizontal planar platform having an upper surface, a lower surface, a center, an outer edge, and a longitudinal opening extending from the center of the upper platform to the outer edge of the upper platform, defining a U-shaped platform;
   a plurality of legs extending downwardly from the lower surface of the upper platform to the upper surface of the lower platform;
   a plurality of angle irons attached to the centers of the upper and lower platforms, the angle irons having gripping teeth adapted for bearing against a tree trunk;
   a plurality of upright posts having first and second ends, the first ends attached about the perimeter of the upper surface of the lower platform, the second ends extending above said upper platform;
   a rail extending between the upright posts; and
   means for securing the angle irons and the support members to the trunk of a tree.

2. The tree stand according to claim 1, wherein said means for securing the angle irons and support members to the trunk of a tree comprises an adjustable strap.

3. The tree stand according to claim 2, further comprising a hook disposed opposite the teeth on the second ends of the support members, the hook being adapted to support said adjustable strap.

4. The tree stand according to claim 2, wherein each of the second ends of the support member further comprises a vertically oriented gusset, the gusset having the teeth, the gusset having a parallel, vertically oriented slot formed therein, the adjustable strap being threadable through the slot.

5. The tree stand according to claim 1, wherein said upper and lower platforms each further comprise a crossmember removably attached adjacent the outer edges of the upper and lower platforms, the crossmembers spanning the longitudinal openings in said upper and lower platforms.

6. The tree stand according to claim 1, wherein said lower rectangular platform has first and second halves defining said lower platform and a bolting system connecting the first and second halves.

7. The tree stand according to claim 6, wherein said bolting system comprises:
   a plurality of threaded bores defined in the first and second halves, the threaded bores on the first half being aligned with the threaded bores on the second half;
   a plurality of bolts extending through the threaded bores in the two halves to connect the first half to the second half; and
   a plurality of nuts secured to the bolts.

8. The tree stand according to claim 6, wherein said lower platform further comprises a crossmember removably attached adjacent the outer edge of the lower platform, the crossmember spanning the longitudinal opening on said lower platform.

9. The tree stand according to claim 1, wherein said upper planar platform has first and second halves defining said lower platform, a hinge connecting the first and second halves, and beveled corners.

10. The tree stand according to claim 9, wherein said upper platform further comprises a crossmember removably attached adjacent the outer edge of the upper platform, the crossmember spanning the longitudinal opening in said upper platform.

11. The tree stand according to claim 1, further comprising a ladder attached to the outer edge of said lower platform.

* * * * *